United States Patent
Marraccini et al.

[11] Patent Number: 4,585,864
[45] Date of Patent: Apr. 29, 1986

[54] SILANATED QUINACRIDONE DYES

[75] Inventors: Antonio Marraccini, Dormelletto; Filippo M. Carlini, Novara; Antonio Pasquale, Novara; Michele Pontevivo, Novara, all of Italy

[73] Assignee: Montedison S.p.A., Milan, Italy

[21] Appl. No.: 683,133

[22] Filed: Dec. 18, 1984

[30] Foreign Application Priority Data

Dec. 27, 1983 [IT] Italy .................. 24386 A/83

[51] Int. Cl.⁴ ............... C09B 48/00; C07D 471/04
[52] U.S. Cl. ........................ 546/14; 546/49; 8/581; 8/506; 8/536; 8/537; 8/637; 8/657; 8/918
[58] Field of Search ................... 546/14, 49

[56] References Cited

U.S. PATENT DOCUMENTS 4,458,073 7/1984 Marraccini et al. ............ 546/14

Primary Examiner—Robert T. Bond
Attorney, Agent, or Firm—Stevens, Davis, Miller & Mosher

[57] ABSTRACT

Silane quinacridone dyes, composite pigments obtainable therefrom by association with an inorganic substrate, and the processes for preparing them. The dyes have the general formula:

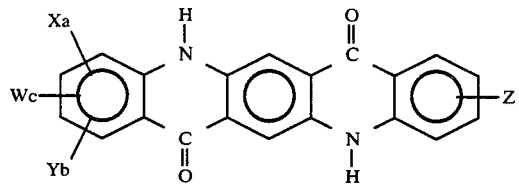

wherein X is an $-SO_2NHR$ group, where R is an alkyl group, linear or branched, having from 1 to 6 carbon atoms, a cycloalkyl group, a phenyl group optionally substituted by one or more alkyl or alkoxy groups ($C_1$-$C_6$), a halogen; Y and Z indicate a silane group having the formula:

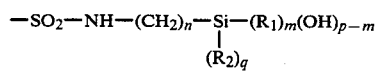

wherein $R_1$ is an alkoxy group ($C_1$-$C_2$), $R_2$ is an alkyl group ($C_1$-$C_4$) or a phenyl group; n is 3, 4 or 5; q is 0 or 1; p and m are integers, such that when q is 1, p is 2 and m is 0, 1 or 2, and when q is 0, p is 3 and m is 0, 1, 2 or 3; W indicates an $-SO_3H$ group; a, b and c are 0 or 1, selected in such a way that the sum a+b+c is equal to 1.

The composite pigments obtained from said dyes are used in paints, air enamels and stove enamels, in the pigmentation of plastics, and in printing inks.

2 Claims, No Drawings

SILANATED QUINACRIDONE DYES

DESCRIPTION

The present invention relates to quinacridone dyes containing, in chemical combination, at least one silane group, and to the corresponding composite pigments obtainable by association thereof with a solid inorganic substrate.

Whenever used in the following description, "composite pigment" means a pigmentary material consisting of an association of said quinacridone dyes containing at least one silane group with an inorganic solid substrate or support.

The aforementioned association of the quinacridone dye containing at least one silane group or, briefly, silanated quinacridone dye, with the solid substrate imparts a pigmentary nature to said dye.

Such association is obtained by the formation of chemical bonds (grafting) between the silane portion of the dye and the inorganic support.

An object of the present invention is to provide saturated quinacridone dyes, insoluble in water, and suitable for providing composite pigments endowed with high pigmentary properties.

Other objects are to be found in the preparation of said dyes and pigments using simple and economical processes.

These and other objects, which will become clear from the following detailed description, are achieved with the silanic quinacridone dyes and with the composite pigments obtainable therefrom by grafting the dyes on the surface of an inorganic substrate, and with the corresponding preparation processes.

One object of the present invention, therefore, consists of the quinacridone dyes containing at least one silane group having the formula:

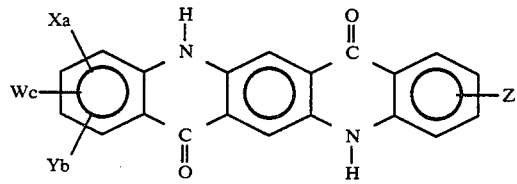
(I)

wherein X is an —SO$_2$NHR group, where R is an alkyl group, linear or branched, having from 1 to 6 carbon atoms, a cycloalkyl group, a phenyl group optionally substituted by one or more alkyl or alkoxy groups (C$_1$–C$_6$), a halogen; Y and Z indicate a silane group having the formula:

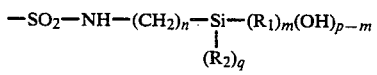

wherein R$_1$ is an alkoxy group (C$_1$–C$_2$), R$_2$ is an alkyl group (C$_1$–C$_4$) or a phenyl group; n is 3, 4 or 5; q is 0 or 1; p and m are integers, such that when q is 1, p is 2 and m is 0, 1 or 2, and when q is 0, p is 3 and m is 0, 1, 2 or 3; W indicates an —SO$_3$H group; a, b and c are 0 or 1, selected in such a way that the sum a+b+c is equal to 1.

They are prepared by a process consisting or consisting essentially in reacting a quinacridone sulphochloride having the formula:

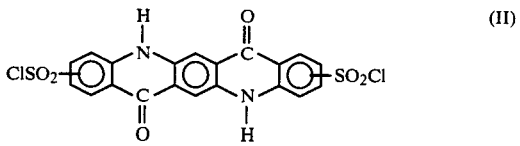
(II)

with a silanic compound having the formula:

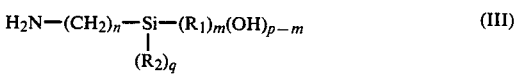
(III)

wherein R$_1$, R$_2$, m, n, p and q have the meanings hereinabove indicated, according to a molar ratio of silanic compound (III): sulphochloride (II) of at least 1 and, optionally, with a compound having the formula:

(IV)

wherein R has the meaning hereinabove indicated, utilizing at least one molar of silanic compound (III) and at least one mole of amine (IV) for each mole of sulphochloride (II), in a reaction medium consisting or consisting essentially of water and/or organic solvents, at a temperature ranging between 5° C. and the reflux temperature of the reaction medium, for 1 to 12 hours.

In practice, in the case where one wants to obtain essentially the dyes of formula (I) where b is 1, a molar ratio of silanic compound (III): sulphochloride (II) of at least 2 must be used; in case one wants to obtain the dyes of formula (I) wherein c is 1, a substantially equimolar ratio of compound (III): sulphochloride (II) is used; in case one wants to obtain the dyes of formula (I) wherein a is 1, substantially equimolar ratios of the compounds (III):(II):(IV) are used.

The reaction may be optionally performed in the presence of a hydrochloric acid-acceptor compound, such as Na$_2$CO$_3$, NaHCO$_3$, pyridine, and triethylamine.

The reaction can be carried out in aqueous suspension, in organic solvents, or in mixtures of water and organic solvents miscible with water.

As organic solvents, one may employ those miscible with water, such as, for instance, dimethylformamide, dioxane, acetonitrile, pyridine, triethylamine, as well as those non-miscible with water, such as, for example, xylene, nitrobenzene, dischlorobenzene.

The quinacridone sulphochloride having the formula (II) may be prepared according to essentially conventional methods, for example, by treating quinacridone with chlorosulphonic acid at temperatures ranging between 5° and 120° C. for 1 to 4 hours.

Silanic compounds having formula (III) which have proved to be particularly suitable are amino-alkoxy-silane derivatives, such as, for example, γ-aminopropyl-triethoxy silane, δ-amino-butyl-triethoxy silane, δ-aminobutyl-phenyl-diethoxy silane, γ-aminopropyl-methyl-diethoxy silane. Said amino-alkoxy silanes are known and commercially available compounds. However, they may be prepared according to conventional techniques, for instance, by reacting the corresponding chloro-alkoxy-silanes with aliphatic amines.

The amines having formula IV which can be used are, for example, methylamine, ethylamine, propylamine, butylamine, pentylamine, hexylamine, and their branched isomers, aniline, morpholine, cyclohexylamine, toluidines, anisidines and ortho-, meta-, and parachloro-anilines, 2,4- and 3,5-xylidines, dianisidines, dichloroanilines, 2,5-dimethoxy-4-chloroaniline, 2-methyl-4-chloroaniline.

The silanic quinacridone dyes having formula (I) possess good pigmentary properties, such as good solidity to solvents, and, when used in stove enamels, they give products endowed with high tinting strength, with red shades particularly pure and bright, good general resistance, and excellent photostability. By "good solidity to solvents" is meant that the products show good resistance to the action of solvents, i.e., that they have very little solubility in solvents.

The silanic quinacridone compounds having formula (I), due to the fact that their molecule contains silanol groups and/or alkoxy groups hydrolyzable to —Si(OH)$_3$ silanol groups, are capable of self-condensation reactions between the aforementioned silanol groups as well as of chemical reaction with surface hydroxy groups of proper inorganic substrates which condense with those of the dye, thus forming a stable chemical bond (grafting) between the dye and the substrate, and thus providing a composite product having excellent pigmentary characteristics.

The aforesaid dyes are, therefore, preferably utilized in the preparation of composite pigments, which constitutes another object of the present invention, consisting of silanic quinacridone dyes having formula (I) grafted onto an inorganic support.

The silanic dyes having formula (I) which proved to be particularly suitable for preparing composite pigments are those in which c is 0, q is 0, and when b is 1, Y is equal to Z.

The inorganic substrates or supports particularly suitable for imparting pigmentary properties to the silanic quinacridone dyes having formula (I) are the following: TiO$_2$ in its gel, semicrystalline, rutile or anatase forms, of commercial type as well, which can bear surface coatings, consisting of mixtures containing one or more oxides selected from SiO$_2$, Al$_2$O$_3$, TiO$_2$. Moreover, it is possible to employ physical mixtures of TiO$_2$ with SiO$_2$ and/or Al$_2$O$_3$, said supports being finely particulated. Due to their better characteristics, it is preferable to employ mixed substrates of TiO$_2$, SiO$_2$, and/or Al$_2$O$_3$ prepared by precipitation of SiO$_2$ and/or Al$_2$O$_3$, also as alumino-silicates, on crystalline TiO$_2$ particles, according to conventional methods.

In relation to the desired uses, hiding power or tinting strength, the above structures may also be utilized in admixture with each other.

The specific surface of said substrates may vary within wide limits, from 5 to 500 m$^2$/g, and preferably between 10 and 200 m$^2$/g.

Due to their excellent properties, the composite pigments that are particularly preferred are those containing the silanic quinacridone compound of formula (I), in grafted form in amounts ranging from 10 to 50% by weight.

The process for preparing the composite pigments comprising the silanated quinacridone dyes (I), grafted on the aforesaid inorganic substrates, consists or consists essentially in treating the selected substrate with the silanated dye (I) in a reaction medium comprising water and/or inert organic solvents, at a temperature ranging between 20° C. and the solvent reflux temperature; then the resulting product is separated by filtration, washing and drying.

The above treatment can be advantageously performed by grinding the silanated dyes with the substrate in the aformentioned reaction medium, either at room temperature or in a hot reactor, for a time period of 2 to 12 hours, according to the reaction temperature used. Particularly advantageous results are obtained if the composite pigment, after its separation by filtration, is subjected to a dry heat treatment in an oven for 4–8 hours at 60°–110° C. prior to washing, which washing is done in order to remove the non-grafted silane dye.

The inert organic solvents employed can be, for example, the aliphatic hydrocarbons (e.g., n-heptane), their chlorinated derivatives (e.g., tetrachloroethane), the alicyclic and aromatic hydrocarbons and their derivatives (e.g., benzene, toluene, xylenes, nitrobenzene, chlorobenzenes), the alkyl or aryl ethers and ketones (e.g., N-methyl-pyrrolidone, diphenylether), the oxides (e.g., dioxane), the amides (e.g., dimethylformamide), the nitriles (e.g., acetonitrile), and the sulphoxides (e.g., dimethylsulphoxide).

The process of the present invention is particularly useful for obtaining deeply colored pigments with high tinting strength, also in the presence of inorganic substrates having low specific surface, such as, for example, highly hiding TiO$_2$.

The composite pigments according to the present invention may have a composition varying over a wide range, depending on the nature, the granulometry, and the specific surface of the substrate particles, as well as in relation to the desired tinting strength of the pigment.

The granulometric analysis of the composite pigment shows that the organic portion is essentially evenly distributed on the surface of the inorganic substrate particles.

The X-ray diffraction analysis indicates that the composite pigment particles show the crystalline aspect of the substrate, while the grafted silanated quinacridone coating is of amorphous nature.

The silanated quinacridone pgiments of the present invention, thanks to their composite nature obtained by chemical bonds between the silanic organic component and the inorganic component, do not give rise to crystallization phenomenon, nor do they change their crystalline form in the presence of aromatic solvents, even if heat treated.

Moreover, the pigmentary compositions based on solvents do not involve sedimentation phenomena, not even on long storage.

The composite pigments, both in their highly hiding and transparent forms, have excellent pigmentary properties, are insoluble in common organic and aqueous solvents, possess excellent resistance to migration in polyvinylchloride (PVC), to overpainting in alkyd stove enamel, and to acid or alkaline treatments. They have excellent photostability and very good tinting strength, are stable to heat both when obtained in transparent form and at ever increasing degrees of hiding power.

They are, therefore, advantageously utilized in painting products, in air and stove enamels, in pigmentation of plastic materials, such as PVC, polystyrene, polyethyleneterephthalate, etc., in printing inks, according to conventional application techniques, to obtain particularly pure and bright red-colored products.

The mechanical and/or heat treatments employed in the aforesaid conventional techniques do not substantially alter the pigmentary characteristics of the composite pigments of the present invention.

Said composite pigments have the considerable advantage of consisting of a portion of inorganic substrate at low cost, capable of imparting excellent pigmentary characteristics, among which, in particular, are the desired degree of hiding power or transparence, excellent resistance to solvents, stability to crystallization and of non-flocculating nature, on which is grafted a silanated quinacridone dye endowed with good photostability, high tinting strength, pure and bright shades.

The invention will now be described in still more detail in the following examples, which are given for illustrative purposes and not as limitations on the scope of the invention.

Unless otherwise specified, parts and percentages are to be understood as parts and percentages by weight.

EXAMPLE 1

200 ml of chlorosulphonic acid, placed in a reactor, in anhydrous medium, and cooled at 5° to 10° C., were gradually additioned in 1.5 hours with 20 parts of beta-quinacridone, then the mixture was gradually heated in one hour up to 80° C. and maintained at this temperature for 3 hours.

The mixture was cooled at 70° to 75° C. and 12 ml of thionyl chloride were added in 15 minutes, then the temperature was raised again to 80° C. and the reaction mixture was maintained at this temperature for 2 more hours.

The mass was cooled at 5° to 10° C., 800 ml of acetone were additioned, then it was filtered, washed with acetone until the liquid became colorless, then with water and ice, with acetone again, and finally it was pump-dried by vacuum suction.

16.49 parts (0.0225 moles) of the sulphochloride derivative thus obtained, 4 parts of water, 100 ml of triethylamine, and 11 parts (0.05 moles) of γ-amino-propyl-triethoxysilane were reacted at 50° C. for 3.5 hours.

The reaction mass, filtered while hot, gave a cake which was twice treated with 200 parts of water, 600 ml of acetone and 50 ml of 30% ammonium hydroxide.

After filtration, the cake was treated again with 200 parts of water, 200 parts of 30% NH$_4$OH and 100 ml of dimethylformamide and maintained at 50° C. for 1 hour.

The mixture was filtered and the cake was treated with a 50/50% mixture of water and dimethylformamide at 80° to 90° C., the aqueous mixture was filtered again, repeatedly washed with water, then with methanol, and finally dried in air.

A friable intensely red-colored powder was obtained which, subjected to elemental analysis, gave the following results: % C=44; % H=4.4; % N=7.62; % S=8.5; % Si=7.5.

The powder, subjected to infrared spectrographic analysis, revealed the bands characteristic of the Si(OH) silanolic groups in the area at 3450 cm$^{-1}$ and in the area between 1000 and 1200 cm$^{-1}$, as well as the bands characteristic of the sulphonamidic groups (—SO$_2$—NH—) in the area ranging between 1300 and 1500 cm$^{-1}$.

The analytical and spectroscopic analyses essentially corresponded to a dye having the formula:

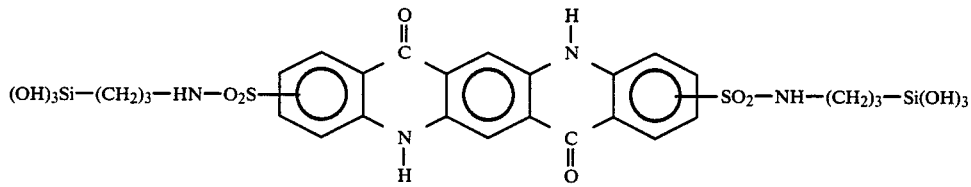

Said dye can also be partially present in oligomeric form by the formation of Si—O—Si siloxanic bonds between the —Si(OH)$_3$ silanolic functions present in the molecule.

EXAMPLE 2

12.22 parts (0.024 moles) of the quinacridone sulphochloride derivative obtained in Example 1 were reacted with 0.65 parts (0.011 moles) of n-propylamine in 90 ml of triethylamine for 2 hours at room temperature and then for 0.5 hours at 35° to 40° C. 3.12 parts (0.014 moles) of γ-aminopropyltriethoxysilane were subsequently added; the temperature was brought to 55° to 60° C. and the reaction medium was maintained at this temperature for 2.5 hours.

It was hot-filtered and subsequently washed and dried, as described in Example 1.

A friable deeply red-colored powder was obtained which, subjected to elemental analysis, gave the following results: % C=48; % H=4.3; % N=8.5; % S=10; % Si=5.

The infrared analysis revealed the same characteristic bands found for the powder of Example 1.

The analytical and spectroscopic analyses essentially corresponded to a dye having the formula:

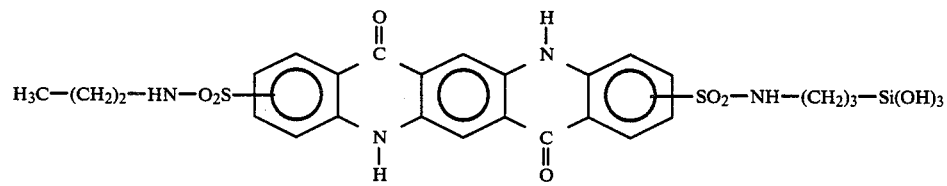

Said dye can also be partially present in an oligomer form.

EXAMPLE 3

By operating under conditions analogous to those described in Example 2, but employing 1.11 parts of aniline instead of n-propylamine and 3.3 parts of γ-aminopropyltriethoxysilane, a deeply red-colored powder was obtained which, subjected to elemental analysis, gave the following results: % C=51; % H=4; % N=8.4; % S=10.1; % Si=4.

The analytical and spectroscopic analyses essentially corresponded to a dye having the formula:

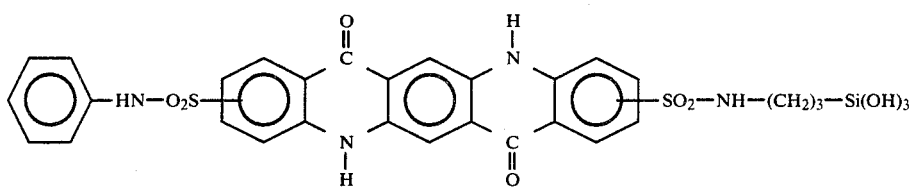

which can also be partially present in oligomeric form.

EXAMPLE 4

A silanated quinacridone composite pigment was prepared by using a mixed inorganic substrate of $TiO_2$, $SiO_2$ and $Al_2O_3$ prepared as follows: 100 parts of $TiO_2$ were dispersed under mechanical stirring in 1 liter of water and the dispersion was then heated to 60° C. After a 15-minute stirring, 210 ml of a sodium silicate solution (titer: 365.47 parts/1 of $SiO_2$) were added and successively, in 3 hours, 200 ml of an aluminum sulphate solution (titer: 60 parts/1 of $Al_2O_3$) were added. Addition was stopped when the pH of the slurry reached a value of 6. Stirring was continued for 1 hour, and then the product was filtered, washed with water to remove soluble salts, and finally dried at a temperature of 70° C.

The dry product was crushed and then ground in an automatic mortar. A white powder, having the following composition, was obtained: % $TiO_2$=43.4; % $SiO_2$=35.1; % $Al_2O_3$=7.15; % $H_2O$=14.35. Its specific surface measured by "Sorptometer" was 120 $m^2/g$; real specific weight—2.74 g/ml; apparent specific weight=0.69 g/cc; % porosity=7.45; and total porosity=1.06 ml/g.

2 parts of the substrate thus obtained and 1 part of the dye obtained according to Example 1 were wet-ground for 12 hours in xylene, then filtered, and the cake obtained was hot-treated overnight at 110° C., then hot-washed with xylene, dimethylformamide, methanol, and finally dried.

A particularly bright deeply red-colored powder was obtained which, subjected to elemental analysis, proved to consist of 68% of inorganic components.

Said powder proved particularly stable to treatments, even under hot conditions, with organic solvents and with water. In applications, such as alkydic stove enamels and polyvinylchloride, it provided bright red-colored products endowed with high hiding power, excellent tinting strength, resistance to overpainting, migration and light, both in mass and when diluted with $TiO_2$.

The powdery composite pigment, subjected to X-ray diffractometric analysis, CuK $\alpha$1.5418 radiation, proved to be formed by particles endowed with the crystallinity characteristic of rutile $TiO_2$, while $SiO_2$, $Al_2O_3$ and the silanated quinacridone coating proved to be amorphous.

Thanks to the amorphous nature of the silanic quinacridone coating, the composite pigment proved particularly stable and not subject to crystallization phenomena resulting from changes of crystalline form due, for instance, to hot treatments with solvents, such as xylene, dimethylformamide and dichlorobenzene.

The pigment subjected to the abovesaid treatments did not change its shade.

Thanks to its composite nature, the pigment did not display sedimentation phenomena, due to demixing of the components, in the formulations with $TiO_2$, such as those employed for the stove enamels.

EXAMPLE 5

One part of the dye obtained as described in Example 1 was introduced into a reactor with 70 parts of water, 1 part of $TiO_2$ and 2.1 ml of sodium silicate solution (titer: 365.47 parts/1 of $SiO_2$).

The suspension was heated up to 60° C. and, under stirring, additioned in 3 hours with 2 ml of aluminum sulphate solution (titer: 60 parts/1 of $Al_2O_3$), maintained at 60° C. for 1 hour, and then cooled to room temperature.

After filtration, the cake obtained was washed with water to neutral pH, dried in an oven at 110° C. for one night, then repeatedly washed with hot water and finally dried. A bright deeply red-colored powder was obtained which, subjected to elemental analysis, proved to consist of 67.5% of inorganic residue.

The product presented applicative properties, solidity, hiding power, tinting strength, and diffractometric characteristics enalogous to those of the pigment obtained according to Example 4.

Similar to the pigment of Example 4, the pigment was free of crystallization phenomenon and, consequently, did not change its shade when hot-treated with solvents, nor did it present a demixing phenomenon of the components in formulations with $TiO_2$.

EXAMPLE 6

One part of the dye obtained as described in Example 1 was introduced into a reactor with 70 parts of water, 4.2 ml of sodium silicate solution (titer: 365.47 parts/1 of $SiO_2$). The suspension was heated to 60° C. and, under stirring, additioned in 3 hours with 4 ml of aluminum sulphate solution (titer: 60 parts/1 of $Al_2O_3$), maintained at 60° C. for 1 hour, and then cooled to room temperature.

After filtration, the cake obtained was washed with water to neutral pH, dried in an oven at 110° C. for one night, then repeatedly washed with hot water and finally dried.

A particularly bright red-colored powder was obtained which, upon analysis, proved to consist of 67.5% of inorganic components.

Subjected to X-ray analysis, the composite pigment was shown to consist of amorphous particles.

In applications such as in stove enamels and in polyvinylchloride, the powder gave products of a bright red shade, perfectly transparent, endowed with excellent solidity and photostability and free of crystallinization and demixing phenomena in formulations with $TiO_2$.

EXAMPLES 7-16

By operating according to the techniques described in Examples 4 to 6, and employing the silanated quinacridone dyes described in Examples 1 to 3, in combination with the inorganic substrates reported below in Table 1, ten red pigments with slight shade differences were prepared, endowed with different hiding power or transparency degrees and with characteristics of stability analogous with those of the products obtained in Examples 4 to 6.

TABLE 1

| Example | Dye of the Example | Inorganic Substrate |
|---------|--------------------|--------------------|
| 7 | 1 | $TiO_2$—$SiO_2$ |
| 8 | 1 | $TiO_2$—$Al_2O_3$ |
| 9 | 1 | $SiO_2$ |
| 10 | 1 | $Al_2O_3$ |
| 11 | 2 | $TiO_2$—$SiO_2$—$Al_2O_3$ |
| 12 | 2 | $SiO_2$ |
| 13 | 2 | $TiO_2$—$Al_2O_3$ |
| 14 | 3 | $TiO_2$—$SiO_2$ |
| 15 | 3 | $Al_2O_3$ |
| 16 | 3 | $TiO_2$—$SiO_2$—$Al_2O_3$ |

EXAMPLE 17 (APPLICATION IN PVC)

In a rotary arm mixer there were mixed, at 70° C.:
1.0 part of the pigment, obtained according to Example 4, previously ground,
100 parts of powdered polyvinylchloride (PVC),
1.5 parts of calcium stearate exerting complexing and stabilizing action,
3.0 parts of epoxidized soybean oil,
0.5 part of lubricant (mixture of glycerides from $C_{16}$ to $C_{36}$), and
2.0 parts of $TiO_2$.

The resulting mixture was then treated at 180° C. in a three-roll refiner until complete dispersion of the pigment was attained, thereby obtaining a sheet exhibiting a bright red color having excellent hiding power, good color brightness, good photostability, good tinting stength, good stability to heat, and excellent solidity to migration.

EXAMPLE 18

5.0 parts of the pigment obtained according to Example 4 were mixed by grinding with 95.0 parts of a fluid carrier having the following composition:
22% of alkyd resin,
19% of melamine resin,
59% of xylene.

Homogenization was accomplished in a ball mill by grinding the mixture in the presence of porcelain balls having a diameter of 10 mm for a time of 24 hours.

The resulting enamel was applied onto the surface to be painted, allowed to dry overnight, and then was placed into an oven at 120° to 125° C. for 30 minutes.

A bright red-colored paint with excellent hiding power, photostability, and stability to overpainting and good tinting strength was obtained.

In order to obtain a paint of a lighter shade and endowed with higher hiding power, 1 part of enamel obtained as hereinabove described was further diluted with 9 parts of a white synthetic stove enamel (10% of $TiO_2$) having the following composition:
30% of alkyd resin,
27% of melamine resin,
33% of xylene,
10% of $TiO_2$.

Homogenization was carried out in a ball mill by grinding the mixture in the presence of procelain balls having a diameter of 10 mm for a time period of 24 hours.

The cut enamel so obtained was applied onto the surface to be painted, allowed to dry overnight, and then maintained in an oven at 120° to 125° C. for 30 minutes. A light red-colored paint of pure shade having excellent general stabilities and high hiding power was obtained.

What is claimed is:

1. A heterocyclic compound containing at least one silane group having the formula:

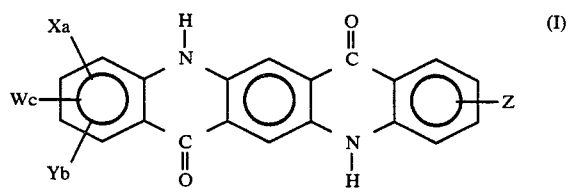

wherein X is an —$SO_2NHR$ group, where R is an alkyl group, linear or branched, having from 1 to 6 carbon atoms, a cycloalkyl group, a phenyl group optionally substituted by one or more alkyl or alkoxy groups ($C_1$-$C_6$), a halogen; Y and Z indicate a silane group having the formula:

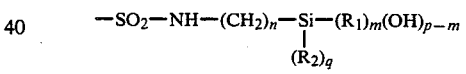

wherein $R_1$ is an alkoxy group ($C_1$-$C_2$), $R_2$ is an alkyl group ($C_1$-$C_4$) or a phenyl group; n is 3, 4 or 5; q is 0 or 1; p and m are integers, such that when q is 1, p is 2 and m is 0, 1 or 2, and when q is 0, p is 3 and m is 0, 1, 2 or 3; W indicates an —$SO_3H$ group; a, b and c are 0 or 1, selected in such a way that the sum a+b+c is equal to 1.

2. A heterocyclic compound according to claim 1, wherein c is 0, q is 0 and, when b is 1, Y is equal to Z.

* * * * *